(12) United States Patent
Shibata

(10) Patent No.: US 12,580,506 B2
(45) Date of Patent: Mar. 17, 2026

(54) GENERATOR, CONTROL DEVICE, AND CONTROL METHOD

(71) Applicant: HONDA MOTOR CO., LTD., Tokyo (JP)

(72) Inventor: Kenji Shibata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/209,187

(22) Filed: Jun. 13, 2023

(65) Prior Publication Data

US 2023/0344372 A1      Oct. 26, 2023

Related U.S. Application Data

(63) Continuation of application No. PCT/JP2021/006939, filed on Feb. 24, 2021.

(51) Int. Cl.
*H02P 9/04* (2006.01)
*H02P 101/25* (2016.01)

(52) U.S. Cl.
CPC ............ *H02P 9/04* (2013.01); *H02P 2101/25* (2015.01)

(58) Field of Classification Search
CPC .............................. H02P 9/04; H02P 2101/25
See application file for complete search history.

(56) References Cited

U.S. PATENT DOCUMENTS

| | | | |
|---|---|---|---|
| 7,173,393 B2 | 2/2007 | Maeda et al. | |
| 2002/0089310 A1* | 7/2002 | Shimizu | H02P 9/04 |
| | | | 322/17 |
| 2012/0229063 A1* | 9/2012 | Yokokawa | H02P 9/48 |
| | | | 318/400.07 |
| 2020/0014311 A1* | 1/2020 | Kaneko | H02P 9/10 |
| 2021/0175718 A1* | 6/2021 | Beekmann | H02M 3/335 |

FOREIGN PATENT DOCUMENTS

| | | | | |
|---|---|---|---|---|
| JP | 2002-204596 A | 7/2002 | | |
| JP | 4367130 B2 | 11/2009 | | |
| JP | 2018-129871 A | 8/2018 | | |
| WO | 2004/030204 A1 | 4/2004 | | |
| WO | WO-2017126104 A1 * | 7/2017 | .......... | G01R 21/133 |
| WO | WO-2019134928 A1 * | 7/2019 | .......... | F03D 7/0284 |

OTHER PUBLICATIONS

WO 2017126104 A1 English translation (Year: 2017).*
International Search Report dated May 11, 2021, issued in counterpart International Application No. PCT/JP2021/006939, with English Translation. (5 pages).

* cited by examiner

*Primary Examiner* — Viet P Nguyen
(74) *Attorney, Agent, or Firm* — WHDA, LLP

(57) ABSTRACT

A generator configured to supply power to a load, including an engine, an alternator configured to be driven by the engine and to output AC power, a converter configured to convert the AC power output from the alternator into DC power, an inverter configured to convert the DC power converted by the converter into AC power and to supply the AC power to the load, and a control unit configured to variably control a value of a voltage output from the converter according to the load.

10 Claims, 6 Drawing Sheets

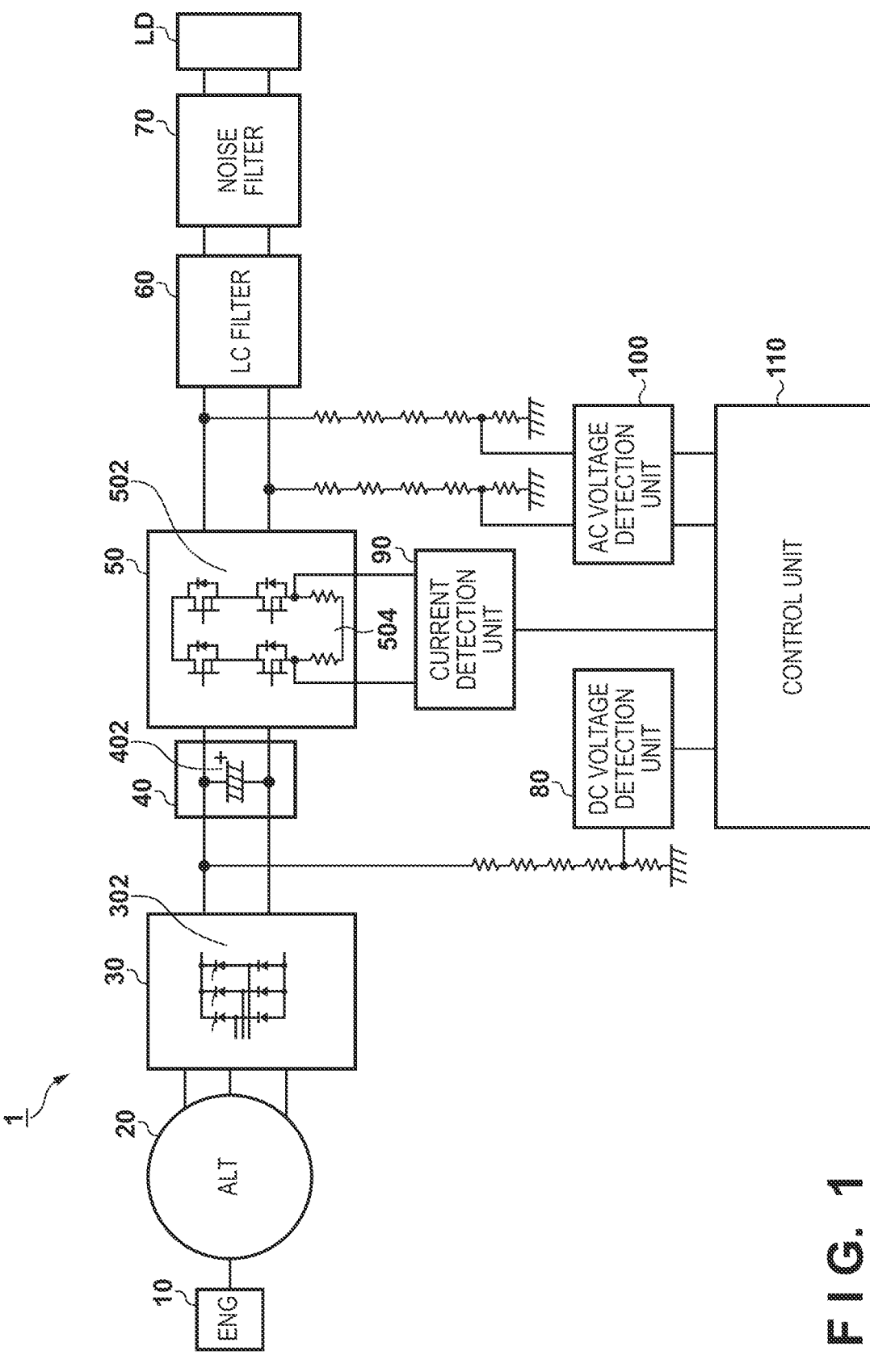
F I G. 1

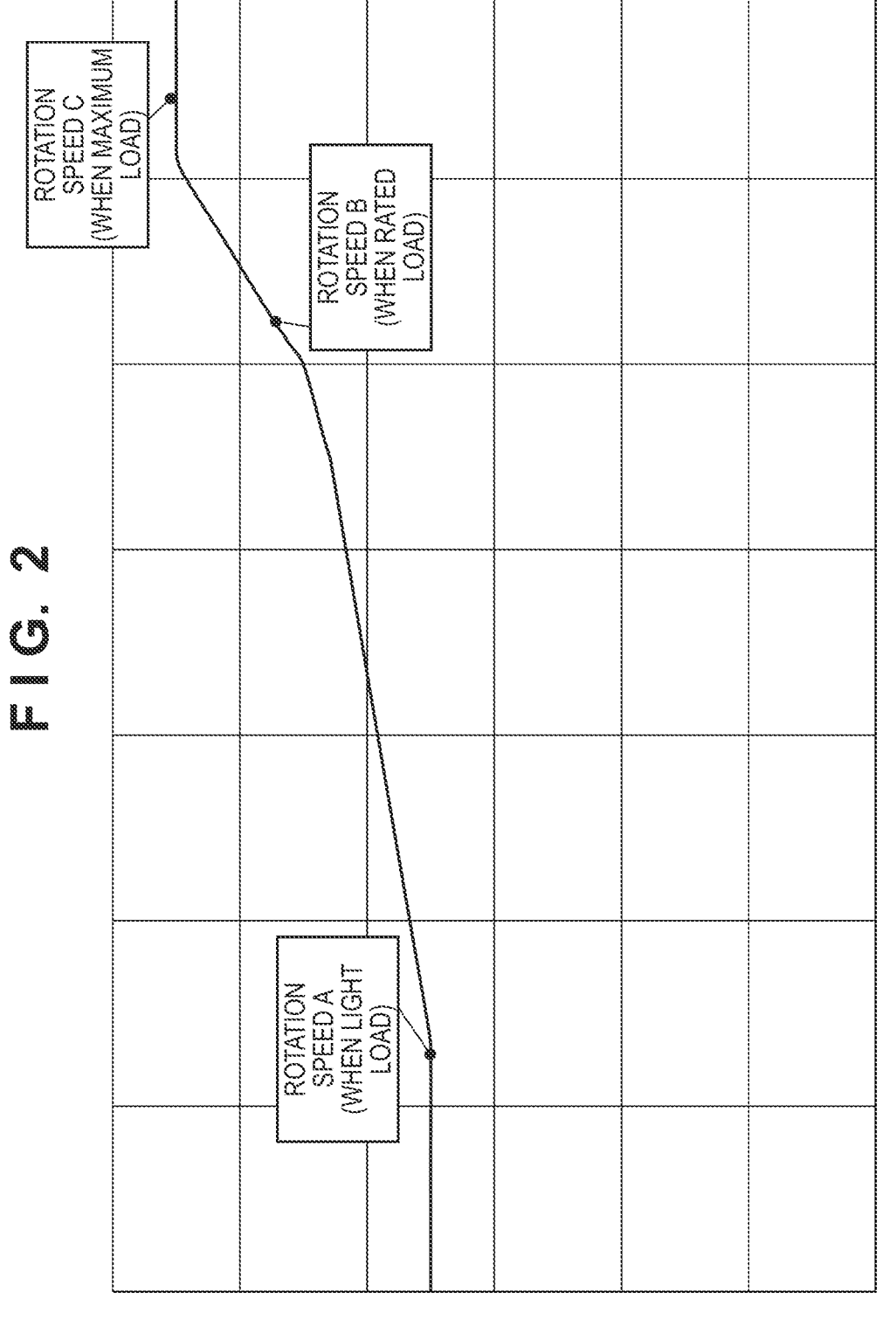
F I G. 2

FIG. 3

F I G. 5
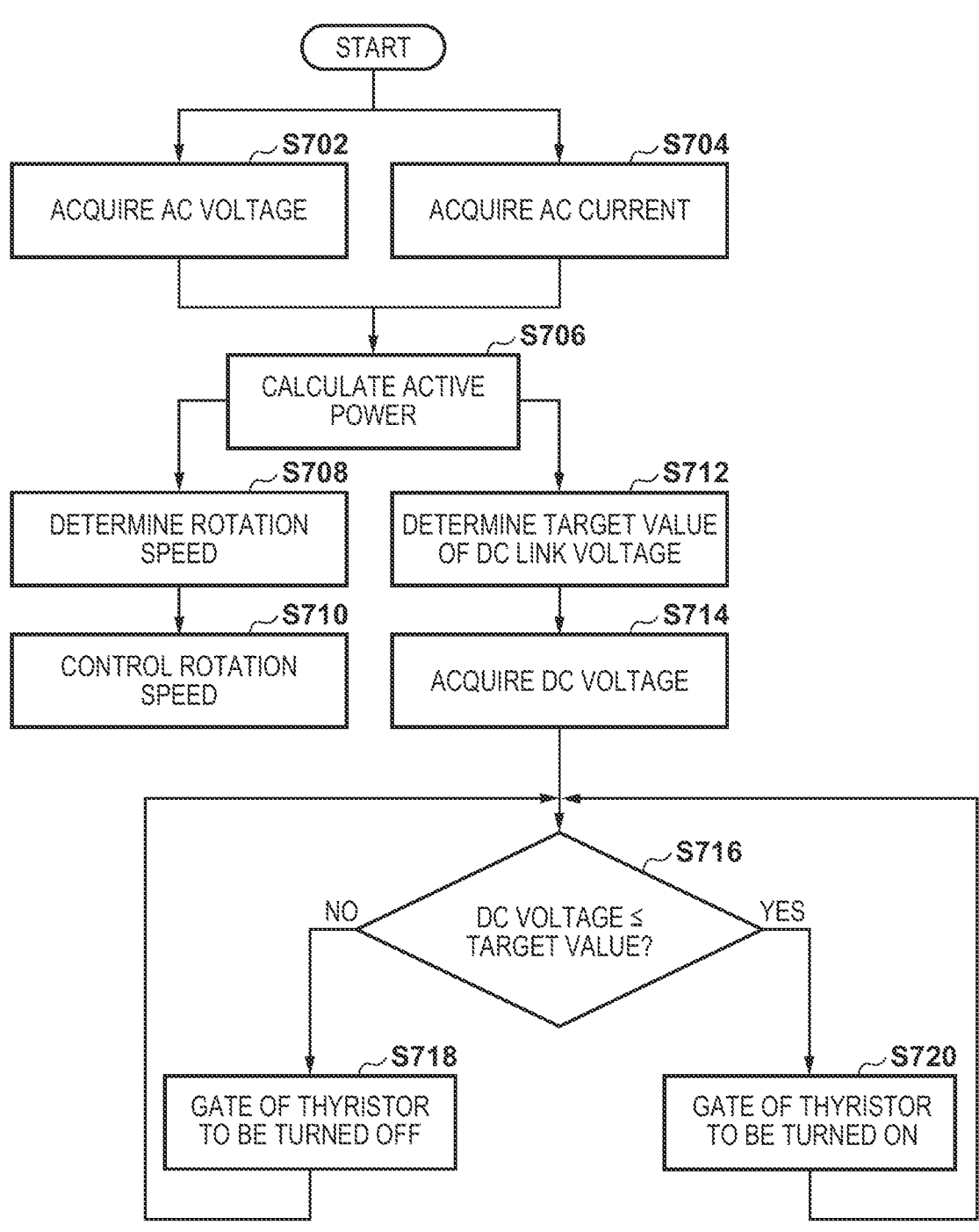

F I G. 6
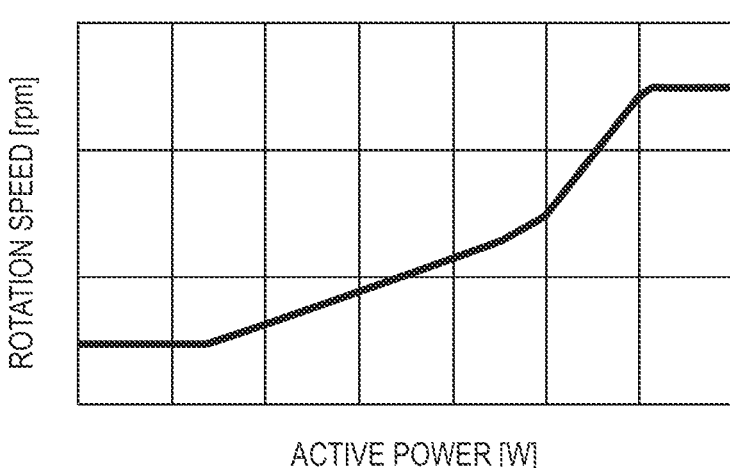
ACTIVE POWER [W]
F I G. 7
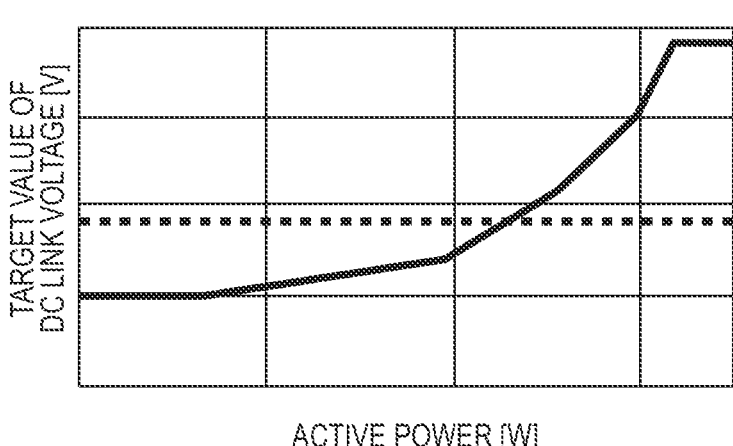
ACTIVE POWER [W]

GENERATOR, CONTROL DEVICE, AND CONTROL METHOD

CROSS-REFERENCE TO RELATED APPLICATION(S)

This application is a continuation of International Patent Application No. PCT/JP2021/006939 filed on Feb. 24, 2021, which is incorporated herein by reference.

TECHNICAL FIELD

The present invention relates to a generator, a control device, and a control method.

BACKGROUND ART

In recent years, as an engine system that drives an alternator (generator) by an engine to output (generate) power, various types of engine generators according to applications have been put into practical use, and in particular, an engine generator having a low displacement and a high output has attracted attention. In the engine generator having a low displacement and a high output, when an engine or an alternator is operated at a high rotation speed, a sound emitted from the engine generator may cause discomfort to people around the engine generator.

Therefore, in general, in the engine generator having a low displacement and a high output, a rotation speed of an engine is controlled such that the engine is operated at a low rotation speed as much as possible during light load output (low output) and is operated at a high rotation speed only during high load output (high output). Note that, in such control, since a range of the rotation speed (low rotation speed to high rotation speed) of the engine is wide, it is difficult to perform a design that achieves both output and efficiency of an alternator.

Several techniques related to such an engine system have been conventionally proposed (see PTL 1).

CITATION LIST

Patent Literature

PTL 1: Japanese Patent No. 4367130

SUMMARY OF INVENTION

Technical Problem

In an engine generator, when power output from an alternator (output of the alternator) is insufficient, for example, it is conceivable to increase a set rotation speed or increase a magnetic flux of the alternator itself. However, the increase in set rotation speed is often limited from viewpoints of noise regulation and merchantability. In addition, the increase in magnetic flux leads to an increase in cost, such as an increase in size of the alternator, an increase in winding, or an increase in magnetic force of a magnet. In addition, as the magnetic flux increases, efficiency of the alternator at a high rotation speed tends to decrease.

The present invention provides a new technique which is advantageous from viewpoints of output and efficiency of the alternator.

Solution to Problem

A generator as one aspect of the present invention is a generator configured to supply power to a load, including an engine, an alternator configured to be driven by the engine and to output AC power, a converter configured to convert the AC power output from the alternator into DC power, an inverter configured to convert the DC power converted by the converter into AC power and to supply the AC power to the load, and a control unit configured to variably control a value of a voltage output from the converter according to the load, wherein the control unit variably controls the value of the voltage output from the converter so that the value of the voltage output from the converter is low at a rotation speed of the alternator at which a margin of power output from the alternator for the load is low and the value of the voltage output from the converter is high at a rotation speed of the alternator at which a margin of power output from the alternator for the load is high.

A control device as another aspect of the present invention is a control device configured to control a generator including an engine, an alternator configured to be driven by the engine and to output AC power, a converter configured to convert the AC power output from the alternator into DC power, and an inverter configured to convert the DC power converted by the converter into AC power and to supply the AC power to a load, including a control unit configured to variably control a value of a voltage output from the converter according to the load, wherein the control unit variably controls the value of the voltage output from the converter so that the value of the voltage output from the converter is low at a rotation speed of the alternator at which a margin of power output from the alternator for the load is low and the value of the voltage output from the converter is high at a rotation speed of the alternator at which a margin of power output from the alternator for the load is high.

A control method as yet another aspect of the present invention is a control method for controlling a generator including an engine, an alternator configured to be driven by the engine and to output AC power, a converter configured to convert the AC power output from the alternator into DC power, and an inverter configured to convert the DC power converted by the converter into AC power and to supply the AC power to a load, including a control step of variably controlling a value of a voltage output from the converter according to the load, wherein in the control step, the value of the voltage output from the converter is variably controlled so that the value of the voltage output from the converter is low at a rotation speed of the alternator at which a margin of power output from the alternator for the load is low and the value of the voltage output from the converter is high at a rotation speed of the alternator at which a margin of power output from the alternator for the load is high.

Advantageous Effects of Invention

The present invention can provides, for example, a new technique which is advantageous from viewpoints of output and efficiency of the alternator.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 1 is a schematic diagram illustrating a configuration of a generator as one aspect of the present invention.

FIG. 2 is a diagram illustrating a relationship between active power, which is an output required by a load, and a rotation speed of an engine.

FIG. 3 is a diagram illustrating voltage-current characteristics and power-current characteristics of an alternator.

FIG. 5 is a flowchart for describing a sequence of a process of controlling a DC link voltage in the present embodiment.

FIG. 6 is a diagram illustrating an example of information indicating a relationship between active power and a rotation speed to be set in an engine so as to correspond to the active power.

FIG. 7 is a diagram illustrating an example of information indicating a relationship between active power and a DC link voltage corresponding to the active power.

DESCRIPTION OF EMBODIMENTS

Figure 4:
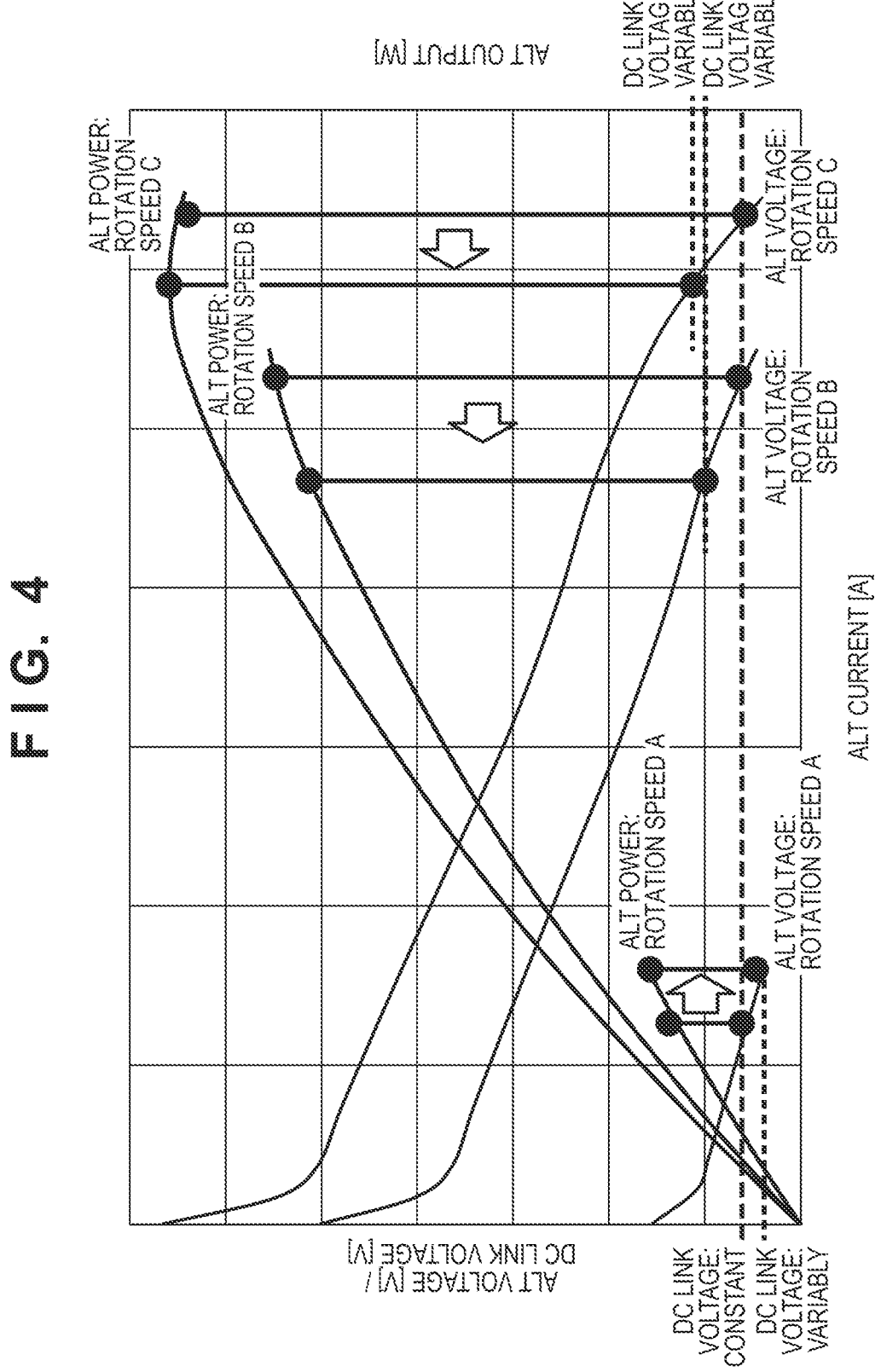
FIG. 4 is a diagram illustrating voltage-current characteristics and power-current characteristics of the alternator.

Hereinafter, an embodiment will be described in detail with reference to the attached drawings. Note that the following embodiment does not limit the invention according to the claims, and not all combinations of features described in the embodiment are essential to the invention. Two or more of the plurality of features described in the embodiment may be arbitrarily combined together. In addition, the same reference numerals are given to the same or similar configurations, and redundant description thereof is omitted.

FIG. 1 is a schematic diagram illustrating a configuration of a generator 1 as one aspect of the present invention. The generator 1 is a generator (power supply) that supplies power to a load LD connected to the generator 1, such as an electric device, without requiring a commercial power supply. The generator 1 is suitable as, for example, a generator in an area where a power transmission network is not widespread or at the time of power failure of a commercial power supply. The generator 1 may be a portable device or a stationary device.

As illustrated in FIG. 1, the generator 1 includes an engine (ENG) 10, an alternator (ALT) 20, a converter 30, a DC link 40, an inverter 50, an LC filter 60, a noise filter 70, a DC voltage detection unit 80, a current detection unit 90, an AC voltage detection unit 100, and a control unit 110.

The engine 10 is, for example, a 4-stroke internal combustion engine, and is embodied as an engine having a low displacement and a high output in the present embodiment. The engine 10 has a configuration similar to that of a general engine, in which a piston connected to a connecting rod moves up and down in a cylinder by rotation of a crankshaft.

The alternator 20 is a power generation unit that is driven by the engine 10 to output alternating current (for example, a three-phase alternating current) power, that is, to generate AC power (power supply) to be supplied to the load LD using rotation of the engine 10 as a drive source. Specifically, the alternator 20 is connected to the engine 10 (crankshaft). Therefore, the alternator 20 (rotor) rotates by rotation of the engine 10 to generate AC power.

The converter 30 converts the AC power output from the alternator 20 into DC power. The converter 30 includes, for example, a three-phase rectifier circuit including a thyristor and a diode, and performs full-wave rectification via the three-phase rectifier circuit to convert the AC power into DC power. In the present embodiment, the converter 30 includes a bridge circuit 302 including a thyristor and a diode as a three-phase rectifier circuit as illustrated in FIG. 1. The thyristor is a semiconductor element having three terminals of an anode (A), a cathode (K), and a gate (G), and capable of electrically connecting the anode and the cathode to each other by causing a current to flow from the gate to the cathode.

The DC link 40 is connected between the converter 30 and the inverter 50, and inputs the DC power converted by the converter 30 to the inverter 50. In other words, the DC link 40 is a link connecting the converter 30 and the inverter 50 to each other with a direct current. The DC link 40 includes, for example, a capacitor 402 such as an electric field capacitor, and has a function of smoothing output of the converter 30. Hereinafter, a voltage at the DC link 40 (voltage applied to the capacitor 402) is referred to as a DC link voltage.

The inverter 50 converts the DC power input via the DC link 40 (that is, the DC power converted by the converter 30) into AC power and supplies the AC power to the load LD via the LC filter 60 and the noise filter 70. Note that the inverter 50 suppresses variations in output by performing, for example, pulse width modulation (PWM) control when converting the DC power into AC current. In the present embodiment, as illustrated in FIG. 1, the inverter 50 includes four switch circuits, specifically, an H bridge circuit 502 including a transistor.

The LC filter 60 includes a filter circuit in which an inductor (L) and a capacitor (C) are combined. The LC filter 60 has a function of extracting or removing a specific frequency band from output from the inverter 50.

The noise filter 70 includes a coil, a capacitor, ferrite, and the like. The noise filter 70 has a function of removing high frequency noise included in output from the LC filter 60 (for example, noise generated in the inverter 50).

The DC voltage detection unit 80 includes a movable coil type DC voltmeter including a permanent magnet and a coil, and detects a voltage (DC voltage) output from the converter 30. The DC voltage detection unit 80 is disposed at a subsequent stage of the converter 30, specifically, between the converter 30 and the inverter 50, and is connected in parallel with the converter 30. As illustrated in FIG. 1, the DC voltage detection unit 80 detects the DC voltage by connecting resistors in series and forming a voltage dividing circuit. Note that, in the present embodiment, the case where the DC voltage detection unit 80 detects the DC voltage using the voltage dividing circuit has been described, but the present invention is not limited thereto.

The current detection unit 90 includes a movable coil type ammeter having a small internal electric resistance and including a permanent magnet and a coil, and detects a current (AC current) in the inverter 50. The current detection unit 90 is connected in series to the inverter 50, specifically, a shunt resistor 504 disposed in the H bridge circuit 502 of the inverter 50, and detects a current in the shunt resistor 504. The current detection unit 90 actually detects a current flowing through the shunt resistor 504 (a current flowing through the inverter 50) by detecting a voltage across the shunt resistor 504. Note that, in the present embodiment, the case where the current detection unit 90 detects a current in the inverter 50 using the shunt resistor 504 has been described, but the present invention is not limited thereto. The current detection unit 90 only needs to implement a function of detecting a current in the inverter 50, and may be disposed at a subsequent stage of the inverter 50, that is, at an AC output stage.

The AC voltage detection unit 100 includes a movable iron piece type AC voltmeter, and detects a voltage (AC voltage) output from the inverter 50. The AC voltage detection unit 100 is disposed at a subsequent stage of the inverter 50, specifically, between the inverter 50 and the LC filter 60, and is connected in parallel with the inverter 50. As illustrated in FIG. 1, the AC voltage detection unit 100 detects the AC voltage by connecting resistors in series and forming a voltage dividing circuit. Note that, in the present embodiment, the case where the AC voltage detection unit 100 detects the AC voltage using the voltage dividing circuit has been described, but the present invention is not limited thereto. In addition, the AC voltage detection unit 100 only needs to implement a function of detecting a voltage output from the inverter 50, and may be disposed anywhere at an AC output stage of the inverter 50.

The control unit 110 is a control device including a processor represented by a CPU, a storage device such as a semiconductor memory, an interface, and the like. For example, the control unit 110 integrally controls the units of the generator 1 according to a program stored in a storage unit to operate the generator 1.

In the present embodiment, the control unit 110 controls driving of the engine 10 and the converter 30. For example, the control unit 110 determines a rotation speed to be set in the engine 10 according to the load LD, and controls the engine 10 such that the engine 10 rotates at the rotation speed (that is, controls the rotation speed of the engine 10). Specifically, the control unit 110 controls the rotation speed of the engine 10 so as to drive the engine 10 at a low rotation speed when the load LD is a light load (low output) and so as to drive the engine 10 at a high rotation speed when the load LD is a high load (high output). As described above, the control unit 110 controls the rotation speed of the engine 10 in a wide range from a low rotation speed to a high rotation speed.

Meanwhile, as described above, when the range of the rotation speed of the engine 10 is wide, it is difficult to achieve both output and efficiency of the alternator 20. Therefore, the control unit 110 further variably controls a value of a voltage output from the converter 30, in the present embodiment, a value of a DC link voltage of the DC link 40 according to the load LD. For example, the control unit 110 sets the value of the DC link voltage to be low when the load LD is a light load, that is, at a low rotation speed, and sets the value of the DC link voltage to be high when the load LD is a high load, that is, at a high rotation speed. As described above, output or efficiency of the alternator 20 can be improved by controlling the DC link voltage according to output characteristic of the alternator 20. Note that a load band for controlling the DC link voltage to be high or a load band for controlling the DC link voltage to be low depends on output characteristic of the alternator 20, and therefore the present invention is not limited thereto. In addition, depending on output characteristics of the alternator 20, it is also possible to simultaneously improve output and efficiency of the alternator 20, that is, to achieve both output and efficiency of the alternator 20.

Here, before description of control of the DC link voltage (voltage output from the converter 30) in the present embodiment, problems in prior art will be specifically described.

FIG. 2 is a diagram illustrating a relationship between active power [W], which is an output required by the load LD, and a rotation speed [rpm] of the engine 10 in the generator 1. As illustrated in FIG. 2, in the generator 1, the rotation speed of the engine 10 can be set in a range from a rotation speed A to a rotation speed C. The rotation speed A is a rotation speed when the load LD is a light load, the rotation speed B is a rotation speed when the load LD is a rated load, and the rotation speed C is a rotation speed when the load LD is a maximum load. A magnitude relationship among the rotation speeds A, B, and C is A<B<C.

Figure 3:
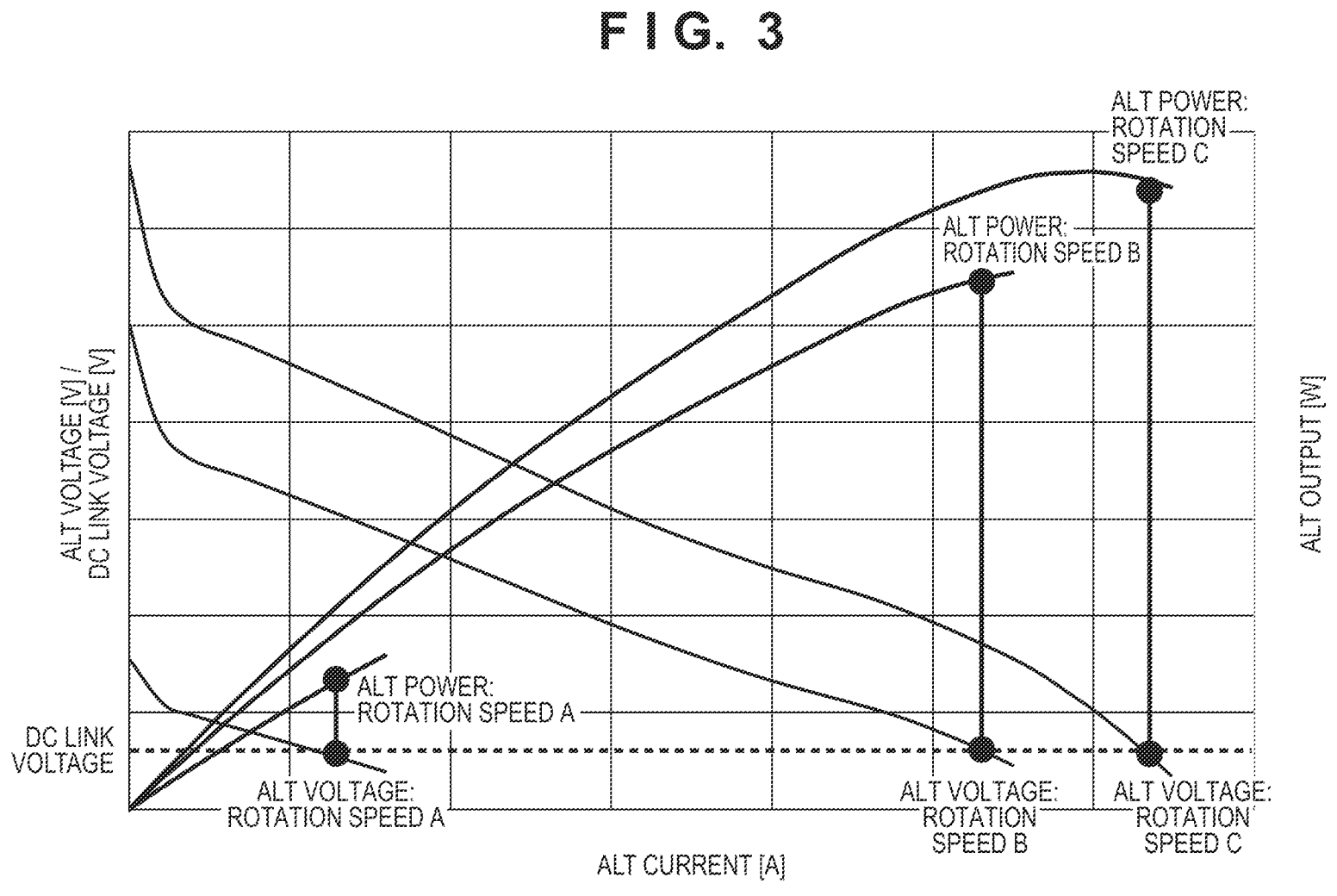

FIG. 3 is a diagram illustrating voltage-current characteristics and power-current characteristics of the alternator 20 corresponding to each of the rotation speeds A, B, and C illustrated in FIG. 2. In FIG. 3, a dotted line indicates a DC link voltage regulated by the converter 30. Power that can be output (supplied) from the alternator 20 when the converter 30 is driven is power corresponding to a point at which a voltage of the alternator 20 is equal to a DC link voltage, and the point is an operating point (ALT operating point) of the alternator 20. In general, efficiency (ALT efficiency) of the alternator 20 increases as a current value at the ALT operating point decreases, and the ALT efficiency decreases as the current value at the ALT operating point increases.

In the engine generator having a low displacement and a high output, generally, a margin of an output of the alternator with respect to a required output required for the alternator is low at a low rotation speed of the engine, and therefore the output tends to be insufficient. Meanwhile, the margin of the output of the alternator with respect to the required output required for the alternator is high at a high rotation speed of the engine. In order to increase the margin of the output of the alternator at a low rotation speed of the engine, it is necessary to increase the rotation speed and a magnetic flux of the alternator itself. Note that the increase in rotation speed is often limited from viewpoints of noise regulation and marketability, and the increase in magnetic flux leads to an increase in cost and weight, such as an increase in size and winding of the alternator or an increase in magnetic force of a magnet. In addition, since a current value at the ALT operating point at a high rotation speed increases due to the increase in magnetic flux, the ALT efficiency decreases.

In order to improve the ALT efficiency at a high rotation speed of the engine, it is necessary to decrease a current value at the ALT operating point, and therefore, it is only required to reduce the rotation speed and the magnetic flux of the alternator itself. Note that the output is likely to be insufficient by reducing the rotation speed. When the magnetic flux of the alternator is reduced, the ALT efficiency at a high rotation speed of the engine can be improved, but as described above, the output is likely to be insufficient at a low rotation speed of the engine at which the margin of the output of the alternator is low.

As described above, in the engine generator, as the range of the rotation speed of the engine is wider, it is more difficult to achieve both output and efficiency of the alternator.

Therefore, in the present embodiment, as described above, the ALT operating point is changed by variably controlling a value of the DC link voltage, which is constant in prior art.

FIG. 4 is a diagram illustrating voltage-current characteristics and power-current characteristics of the alternator 20 corresponding to each of the rotation speeds A, B, and C illustrated in FIG. 2 when a value of the DC link voltage is variably controlled. Referring to FIG. 4, it can be seen that an output of the alternator 20 at the ALT operating point is improved by setting a value of the DC link voltage to be low at the rotation speed A at which a margin of the output of the alternator 20 is low. In addition, it can be seen that a current at the ALT operating point is reduced and efficiency of the alternator 20 is improved by setting a value of the DC link voltage to be high at the rotation speed B at which a margin of the output of the alternator 20 is high. Note that the output of the alternator 20 is also reduced, but the margin of the output of the alternator 20 is high at the rotation speed B, and therefore there is no problem. Similarly, it can be seen that a current at the ALT operating point is reduced and efficiency of the alternator 20 is improved by setting a value of the DC link voltage to be high at the rotation speed C at which a margin of the output of the alternator 20 is high. Furthermore, at the rotation speed C, the ALT operating point is located at a peak point of the output of the alternator 20, and therefore the output of the alternator 20 is also improved.

In the present embodiment, the case where the generator 1 is an engine generator having a low displacement and a high output has been described, but the present invention is not limited thereto. The present invention contributes to improving outputs and efficiencies of generators obtained by combining engines and alternators having various specifications.

Referring to FIG. 5, a sequence of a process of controlling the DC link voltage in the present embodiment will be described. As described above, the process is performed by the control unit 110 integrally controlling the units of the generator 1.

In S702, the control unit 110 detects a voltage (AC voltage) output from the inverter 50 via the AC voltage detection unit 100, and acquires the detected value as an AC voltage.

In S704, the control unit 110 detects a current (AC current) in the inverter 50 via the current detection unit 90, and acquires the detected value as an AC current. Note that, in the present embodiment, S704 is performed in parallel with S702.

In S706, the control unit 110 calculates active power, which is an output required by the load LD, on the basis of the AC voltage acquired in S702 (value detected by the AC voltage detection unit 100) and the AC current acquired in S704 (value detected by the current detection unit 90). As a result, it is possible to quantitatively grasp a state of the load LD, for example, whether the load LD is a light load or a high load as the active power. Note that any technique known in the art can be applied as a specific method for calculating the active power, and therefore a detailed description thereof is omitted here.

In S708, the control unit 110 determines a rotation speed to be set in the engine 10 according to the active power (load LD) calculated in S706. For example, as illustrated in FIG. 6, the control unit 110 can determine the rotation speed to be set in the engine 10 so as to correspond to the active power calculated in S706 by referring to a rotation speed map that is information indicating a relationship between the active power [W] and the rotation speed [rpm] to be set in the engine 10 according to the active power. Note that the rotation speed map needs to be acquired in advance by experiment, simulation, or the like and stored in a storage unit or the like.

In S710, the control unit 110 sets the rotation speed determined in S708 in the engine 10, and controls the rotation speed of the engine 10 such that the engine 10 is driven at the rotation speed. As described above, in the present embodiment, the engine 10 is driven at a rotation speed suitable for the active power (load LD) under the control of the control unit 110.

In S712, the control unit 110 determines a target value of the DC link voltage (voltage to be output from the converter 30) on the basis of the active power calculated in S706. For example, as illustrated in FIG. 7, the control unit 110 can determine the target value of the DC link voltage corresponding to the active power calculated in S706 by referring to a voltage map that is information indicating a relationship between the active power [W] and the DC link voltage [V] corresponding to the active power. Note that the voltage map needs to be acquired in advance by experiment, simulation, or the like and stored in a storage unit or the like. Note that, in the present embodiment, the voltage map corresponding to the active power has been described, but a voltage map corresponding to the rotation speed may be used.

In S714, the control unit 110 detects a voltage (DC voltage) output from the converter 30 via the DC voltage detection unit 80, and acquires the detected value as a DC voltage.

Note that, in the present embodiment, S708 and S710 are performed in parallel with S712 and S714, but the present invention is not limited thereto. For example, S708, S710, S712, and S714 may be performed in this order.

In S716, the control unit 110 compares the target value of the DC link voltage determined in S712 with the DC voltage acquired in S714 (value detected by the DC voltage detection unit 80), and determines whether the DC voltage is equal to or smaller than the target value of the DC link voltage (DC voltage≤target value is satisfied). When the DC voltage is not equal to or smaller than the target value of the DC link voltage, that is, when the DC voltage is larger than the target value of the DC link voltage, the process proceeds to S718. Meanwhile, when the DC voltage is equal to or smaller than the target value of the DC link voltage, the process proceeds to S720.

In S718, the control unit 110 controls a gate of the thyristor 302 in the converter 30 to be turned off. As a result, the DC link voltage of the DC link 40 can be lowered to set the value of the DC link voltage to be low (that is, the value of the DC link voltage can be set to the target value determined in S712).

In S720, the control unit 110 controls the gate of the thyristor 302 in the converter 30 to be turned on. As a result, the DC link voltage of the DC link 40 can be raised to set the value of the DC link voltage to be high (that is, the value of the DC link voltage can be set to the target value determined in S712).

As described above, in the present embodiment, in S712, the target value of the DC link voltage of the DC link 40 is determined such that power corresponding to a required output required for the alternator 20 is output from the alternator 20 according to the active power (load LD), whereby output and efficiency of the alternator 20 can be improved. Note that, through S708 and S710, the target value of the DC link voltage can be determined with respect to a state in which the engine 10 is driven at a rotation speed according to the active power, and therefore the output and efficiency of the alternator 20 can be more practically improved. In addition, in S716 to S720, on/off of the gate of the thyristor 302 in the converter 30 is controlled on the basis of the value detected by the DC voltage detection unit 80, whereby the DC link voltage (voltage output from the converter 30) can be controlled, and the output and efficiency of the alternator 20 can be improved according to the active power (load LD). In addition, on/off of the gate of the thyristor 302 is controlled according to a magnitude relationship between the value detected by the DC voltage detection unit 80 and the target value of the DC link voltage of the DC link 40, whereby a margin of the output of the alternator 20 can be improved at a light load, and the efficiency of the alternator 20 can be improved at a high load.

SUMMARY OF EMBODIMENT

1. A generator of the above embodiment is a generator (for example, 1) configured to supply power to a load (for example, LD), including:

an engine (for example, 10);

an alternator (for example, 20) configured to be driven by the engine and to output AC power;

a converter (for example, 30) configured to convert the AC power output from the alternator into DC power;

an inverter (for example, 50) configured to convert the DC power converted by the converter into AC power and to supply the AC power to the load; and a control unit (for example, 110) configured to variably control a value of a voltage output from the converter according to the load, wherein the control unit variably controls the value of the voltage output from the converter so that the value of the voltage output from the converter is low at a rotation speed of the alternator at which a margin of power output from the alternator for the load is low and the value of the voltage output from the converter is high at a rotation speed of the alternator at which a margin of power output from the alternator for the load is high.

According to this embodiment, variably controlling a value of a voltage output from the converter makes it advantageous from viewpoints of the output and efficiency of the alternator.

2. The generator (for example, 1) of the above embodiment, further including a DC link (for example, 40) connected between the converter (for example, 30) and the inverter (for example, 50) and configured to input the DC power converted by the converter to the inverter, wherein the control unit (for example, 110) variably controls a value of a DC link voltage of the DC link as a value of a voltage output from the converter.

According to this embodiment, variably controlling a value of the DC link voltage makes it advantageous from viewpoints of the output and efficiency of the alternator.

3. The generator (for example, 1) of the above embodiment, wherein the control unit (for example, 110)

determines active power of the inverter (for example, 50), determines a target value of a voltage to be output from the converter (for example, 30) on a basis of the active power, and sets a value of the voltage output from the converter to the target value.

According to this embodiment, the output and efficiency of the alternator can be improved.

4. The generator (for example, 1) of the above embodiment, wherein the control unit (for example, 110)

determines a rotation speed of the engine (for example, 10), determines a target value of a voltage to be output from the converter (for example, 30) on a basis of the rotation speed, and sets a value of the voltage output from the converter to the target value.

According to this embodiment, the output and efficiency of the alternator can be improved.

5. The generator (for example, 1) of the above embodiment, further including:

a current detection unit (for example, 90) configured to detect a current in the inverter (for example, 50); and a first voltage detection unit (for example, 100) configured to detect a voltage in the inverter, wherein the control unit (for example, 110) determines the active power on a basis of a value detected by the current detection unit and a value detected by the first voltage detection unit.

According to this embodiment, it is possible to quantitatively grasp a state of a load, for example, whether the load is a light load or a high load as active power.

6. The generator (for example, 1) of the above embodiment, wherein the inverter (for example, 80) includes a shunt resistor (for example, 504), and the current detection unit (for example, 90) detects a current in the shunt resistor.

According to this embodiment, it is possible to detect a current in the shunt resistor as a current in the inverter.

7. The generator (for example, 1) of the above embodiment, wherein the control unit (for example, 110) determines the target value such that power corresponding to a required output required for the alternator (for example, 20) according to the load (for example, LD) is output from the alternator.

According to this embodiment, the output and efficiency of the alternator can be improved.

8. The generator (for example, 1) of the above embodiment, wherein the converter (for example, 30) includes a thyristor (for example, 302), and the control unit (for example, 110) variably controls a value of the voltage output from the converter by controlling the thyristor.

According to this embodiment, it is possible to control a voltage output from the converter.

9. The generator (for example, 1) of the above embodiment, further including a second voltage detection unit (for example, 80) configured to detect the voltage output from the converter (for example, 30), wherein the control unit (for example, 110) controls on/off of a gate of the thyristor (for example, 302) on a basis of a value detected by the second voltage detection unit.

According to this embodiment, it is possible to control a voltage output from the converter.

10. The generator (for example, 1) of the above embodiment, wherein the control unit (for example, 110)

controls the gate of the thyristor (for example, 302) to be turned off when the value detected by the second voltage detection unit (for example, 80) is larger than the target value, and controls the gate of the thyristor to be turned on when the value detected by the second voltage detection unit is equal to or smaller than the target value.

According to this embodiment, it is possible to improve a margin of an output of the alternator at a light load and to improve efficiency of the alternator at a high load.

11. The generator (for example, 1) of the above embodiment, wherein the control unit (for example, 110) determines the target value on a basis of information indicating a relationship between the active power and a value of a voltage to be output from the converter (for example, 30) so as to correspond to the active power.

According to this embodiment, a target value of a voltage to be output from the converter can be easily determined.

12. The generator (for example, 1) of the above embodiment, wherein the control unit (for example, 110)

determines a rotation speed to be set in the engine (for example, 10) according to the load (for example, LD), and determines the target value such that power corresponding to a required output required for the alternator (for example, 20) is output from the alternator in a state where the engine is driven at the rotation speed.

According to this embodiment, output and efficiency of the alternator can be more practically improved.

13. A control device of the above embodiment is a control device configured to control a generator including: an engine (for example, 10): an alternator (for example, 20) configured to be driven by the engine and to output AC power: a converter (for example, 30) configured to convert the AC power output from the alternator into DC power; and an inverter (for example, 50) configured to convert the DC power converted by the converter into AC power and to supply the AC power to a load (for example, LD), including a control unit (for example, 110) configured to variably control a value of a voltage output from the converter according to the load, wherein the control unit variably controls the value of the voltage output from the converter so that the value of the voltage output from the converter is low at a rotation speed of the alternator at which a margin of power output from the alternator for the load is low and the value of the voltage output from the converter is high at a rotation speed of the alternator at which a margin of power output from the alternator for the load is high.

According to this embodiment, variably controlling a value of a voltage output from the converter makes it advantageous from viewpoints of the output and efficiency of the alternator.

14. A control method of the above embodiment is a control method for controlling a generator (for example, 1) including: an engine (for example, 10); an alternator (for example, 20) configured to be driven by the engine and to output AC power; a converter (for example, 30) configured to convert the AC power output from the alternator into DC power; and an inverter (for example, 50) configured to convert the DC power converted by the converter into AC power and to supply the AC power to a load (for example, LD), including a control step of variably controlling a value of a voltage output from the converter according to the load, wherein in the control step, the value of the voltage output from the converter is variably controlled so that the value of the voltage output from the converter is low at a rotation speed of the alternator at which a margin of power output from the alternator for the load is low and the value of the voltage output from the converter is high at a rotation speed of the alternator at which a margin of power output from the alternator for the load is high.

According to this embodiment, variably controlling a value of a voltage output from the converter makes it advantageous from viewpoints of the output and efficiency of the alternator.

The present invention is not limited to the above-described embodiments, and various changes and modifications can be made without departing from the spirit and scope of the present invention. Therefore, in order to make the scope of the present invention public, the following claims are attached.

The invention claimed is:

1. A generator configured to supply power to a load, comprising:

an engine;

an alternator configured to be driven by the engine and to output AC power;

a converter configured to convert the AC power output from the alternator into DC power;

an inverter configured to convert the DC power converted by the converter into AC power and to supply the AC power to the load;

a control unit configured to variably control a value of a voltage output from the converter according to the load; and a DC link connected between the converter and the inverter and configured to input the DC power converted by the converter to the inverter, wherein the control unit sets a rotation speed in the engine according to the load, controls the rotation speed in the engine so as to drive the engine at a low rotation speed when the load is a light load and so as to drive the engine at a high rotation speed when the load is a high load, and changes the rotation speed in a curved manner when driving the engine between the low rotation speed and the high rotation speed, variably controls a value of a DC link voltage of the DC link as a value of a voltage output from the converter, sets the value of the DC link voltage to be low when the load is the light load and sets the value of the DC link voltage to be high when the load is the high load, and sets the value of the DC link voltage to be low and a value of a current to be high when a margin of power output from the alternator for the load is low and the engine drives at the low rotation speed, sets the value of the DC link voltage to be high and the value of a current to be high when the margin of power output from the alternator for the load is high and the engine drives at the low rotation speed, sets the value of the DC link voltage to be low and the value of a current to be low when the margin of power output from the alternator for the load is low and the engine drives at the high rotation speed, and sets the value of the DC link voltage to be high and the value of the current to be low when the margin of power output from the alternator for the load is high and the engine drives at the high rotation speed, and wherein a variable amount of the DC link voltage when the margin of power output from the alternator for the load is high is greater than a variable amount of the DC link voltage when the margin of power output from the alternator for the load is low, and a variable amount of the current when the margin of power output from the alternator for the load is high is greater than a variable amount of the current when the margin of power output from the alternator for the load is low.

2. The generator according to claim 1, further comprising:

a current detection unit configured to detect a current in the inverter; and a first voltage detection unit configured to detect a voltage in the inverter, wherein the control unit determines active power of the inverter on a basis of a value detected by the current detection unit and a value detected by the first voltage detection unit.

3. The generator according to claim 2, wherein the inverter includes a shunt resistor, and the current detection unit detects a current in the shunt resistor.

4. The generator according to claim 1, wherein the control unit determines a target value of a voltage to be output from the converter such that power corresponding to a required output required for the alternator according to the load is output from the alternator.

5. The generator according to claim 1, wherein
the converter includes a thyristor, and
the control unit variably controls a value of the voltage output from the converter by controlling the thyristor.

6. The generator according to claim 5, further comprising a second voltage detection unit configured to detect the voltage output from the converter,
wherein the control unit controls on/off of a gate of the thyristor on a basis of a value detected by the second voltage detection unit.

7. The generator according to claim 6,
wherein the control unit
controls the gate of the thyristor to be turned off when the value detected by the second voltage detection unit is larger than the target value, and
controls the gate of the thyristor to be turned on when the value detected by the second voltage detection unit is equal to or smaller than the target value.

8. The generator according to claim 1, wherein the control unit determines a target value of a voltage to be output from the converter on a basis of information indicating a relationship between an active power and a value of a voltage to be output from the converter so as to correspond to the active power.

9. A control device configured to control a generator including: an engine; an alternator configured to be driven by the engine and to output AC power; a converter configured to convert the AC power output from the alternator into DC power; an inverter configured to convert the DC power converted by the converter into AC power and to supply the AC power to a load; and a DC link connected between the converter and the inverter and configured to input the DC power converted by the converter to the inverter, comprising a control unit configured to variably control a value of a voltage output from the converter according to the load,
wherein the control unit
sets a rotation speed in the engine according to the load,
controls the rotation speed in the engine so as to drive the engine at a low rotation speed when the load is a light load and so as to drive the engine at a high rotation speed when the load is a high load, and changes the rotation speed in a curved manner when driving the engine between the low rotation speed and the high rotation speed,
variably controls a value of a DC link voltage of the DC link as a value of a voltage output from the converter,
sets the value of the DC link voltage to be low when the load is the light load and sets the value of the DC link voltage to be high when the load is the high load, and
sets the value of the DC link voltage to be low and a value of a current to be high when a margin of power output from the alternator for the load is low and the engine drives at the low rotation speed, sets the value of the DC link voltage to be high and the value of a current to be high when the margin of power output from the alternator for the load is high and the engine drives at the low rotation speed, sets the value of the DC link voltage to be low and the value of a current to be low when the margin of power output from the alternator for the load is low and the engine drives at the high rotation speed, and sets the value of the DC link voltage to be high and the value of the current to be low when the margin of power output from the alternator for the load is high and the engine drives at the high rotation speed, and wherein
a variable amount of the DC link voltage when the margin of power output from the alternator for the load is high is greater than a variable amount of the DC link voltage when the margin of power output from the alternator for the load is low, and a variable amount of the current when the margin of power output from the alternator for the load is high is greater than a variable amount of the current when the margin of power output from the alternator for the load is low.

10. A control method for controlling a generator including: an engine; an alternator configured to be driven by the engine and to output AC power; a converter configured to convert the AC power output from the alternator into DC power; an inverter configured to convert the DC power converted by the converter into AC power and to supply the AC power to a load; and a DC link connected between the converter and the inverter and configured to input the DC power converted by the converter to the inverter, comprising a control step of variably controlling a value of a voltage output from the converter according to the load,
wherein the control step,
sets a rotation speed in the engine according to the load,
controls the rotation speed in the engine so as to drive the engine at a low rotation speed when the load is a light load and so as to drive the engine at a high rotation speed when the load is a high load, and changes the rotation speed in a curved manner when driving the engine between the low rotation speed and the high rotation speed,
variably controls a value of a DC link voltage of the DC link as a value of a voltage output from the converter, sets the value of the DC link voltage to be low when the load is the light load and sets the value of the DC link voltage to be high when the load is the high load, and
sets the value of the DC link voltage to be low and a value of a current to be high when a margin of power output from the alternator for the load is low and the engine drives at the low rotation speed, sets the value of the DC link voltage to be high and the value of a current to be high when the margin of power output from the alternator for the load is high and the engine drives at the low rotation speed, sets the value of the DC link voltage to be low and the value of a current to be low when the margin of power output from the alternator for the load is low and the engine drives at the high rotation speed, and sets the value of the DC link voltage to be high and the value of the current to be low when the margin of power output from the alternator for the load is high and the engine drives at the high rotation speed, and wherein
a variable amount of the DC link voltage when the margin of power output from the alternator for the load is high is greater than a variable amount of the DC link voltage when the margin of power output from the alternator for the load is low, and a variable amount of the current when the margin of power output from the alternator for the load is high is greater than a variable amount of the current when the margin of power output from the alternator for the load is low.

* * * * *